Nov. 13, 1951  M. GOLDSCHMIDT ET AL  2,574,639
DUST SHIELD FOR EYEGLASSES
Filed Jan. 3, 1949  2 SHEETS—SHEET 1

INVENTORS
MAX GOLDSCHMIDT
ALBERT SOMMER
BY *Heinrich Hochschild*
ATTORNEY

INVENTORS
MAX GOLDSCHMIDT
ALBERT SOMMER
BY
ATTORNEY

Patented Nov. 13, 1951

2,574,639

UNITED STATES PATENT OFFICE 2,574,639

DUST SHIELD FOR EYEGLASSES

Max Goldschmidt and Albert Sommer,
New York, N. Y.

Application January 3, 1949, Serial No. 68,916

6 Claims. (Cl. 2—14)

The invention relates to a dust shield for eyeglasses of all types, spectacles, pincenez, binoculars, or the like. More particularly it is an object of the invention to develop a dust shield which does not close laterally the space between eyeglass and outer corner of the eye.

The object of the invention thus is a dust shield which effectively prevents dust from reaching the eye but which at the same time does not impede air exchange between the outside and the space between eye and eyeglass. Condensation of moisture on the glasses at change of the temperature, on the one hand, and watering of the eyes from lack of air exchange, on the other hand, will thus be avoided.

In order to achieve these and other objects, which will become apparent as the specification proceeds, the invention provides a dust deflecting attachment for eyeglasses, spectacles or the like which comprises a shield of generally frusto-conical shape attachable to the eyeglass at the rim thereof and spaced apart therefrom. The frusto-conical shape is disposed so as to taper towards the eyeglass and further disposed and shaped so as to extend laterally along the lateral entrance into the open space between eyeglass and outer corner of the eye and spaced apart from the eye.

By means of this frusto-conical shield, air currents and dust entering the space between eyeglass and eye will be deflected towards the eyeglass and, if not falling off, dust will be deposited on the eyeglass but will no longer reach and hurt the eye. Furthermore, the frusto-conical form of the dust shield will not impair the vision field and the field of view of the eye.

The dust deflecting shield disposed along the lateral entrance into the open space between eye and eyeglass may extend circumferentially around the entire rim of the eyeglass. However, since eyeglasses sit rather close to the eyebrow and the adjoining part of the nose, the dust deflecting shield may also extend only along the open side of that space. The height of the frusto-conical shield may be constant over its whole length or it may diminish from the outer corner side inwards.

The term "eyeglasses," when used in the following specification and in the claims, is understood to include also a pair of eyeglasses and thus will refer to the application of a pair of dust deflecting shields to a pair of eyeglasses. The term "eyeglass" will thus include a pair of spectacles, pincenez, and also binoculars, or any other optical appliance or instrument to be employed in an atmosphere where dust shielding of the human eye may be desirable, and also an entire or partial shadowing of the eye from side-light.

The dust deflecting shield may be permanently secured to, or may be attachable to and detachable from, the eyeglass by any convenient or conventional means such as used for instance for the attachment of detachable or exchangable supplemental lenses, polarizers or other anti-glare or sun-protecting screens, or other accessories of eyeglasses.

In order to describe more fully the nature of our invention, we now refer to the accompanying drawings which form part of this specification and which by way of example illustrate various embodiments of our invention. It will be readily understood however that the drawings are intended to be illustrative of our invention but not limitative of its scope and that the invention may be embodied in other forms without departing from the principle underlying our invention and from the ambit of our appended claims.

When in the drawings we have embodied our invention only at one eyeglass, it is to be understood that the same embodiment in symmetrical execution will as a rule be used at the other eyeglass of a pair.

The frame of a pair of spectacles is designated by 11. 12, 13 are the temples and 14, 15 the glasses of the spectacles.

Figure 1:
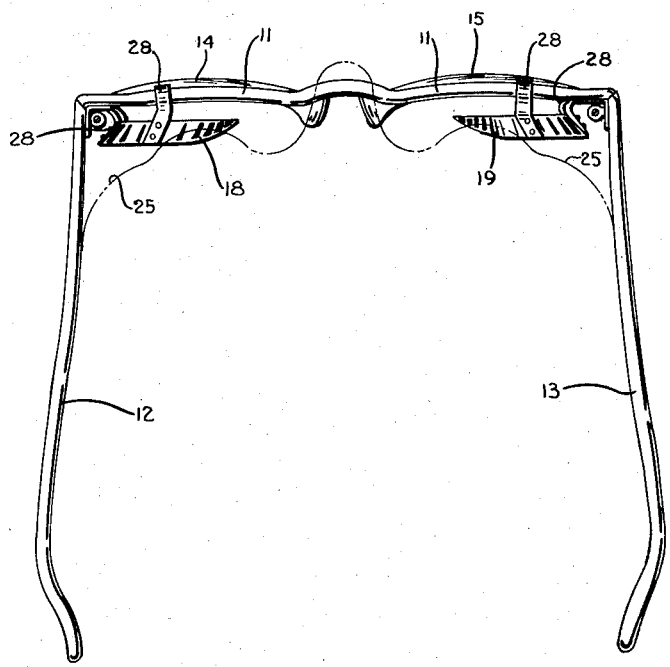
Fig. 1 is a top view.
Figure 2:
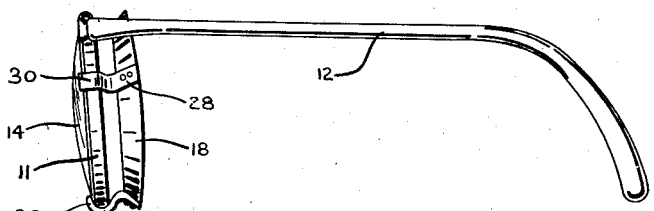
Fig. 2 is a side view of a pair of spectacles provided with dust shields of the invention.
Figure 3:
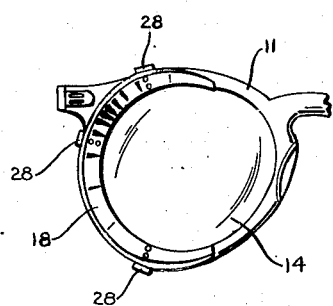
Fig. 3 is a rear view of the left hand glass with dust shield of the spectacles of Figs. 1 and 2, with the temple detached.
Figure 4:
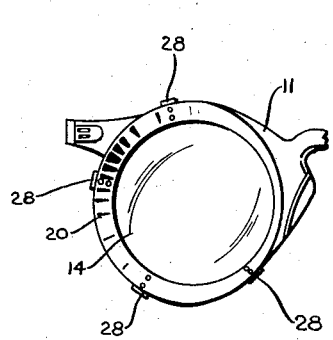
Fig. 4 is a similar rear view of an eyeglass with a modification of the dust shield.
Figure 5:
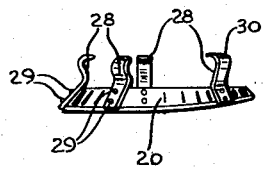
Fig. 5 is a side view of the dust shield of Fig. 4, or the shield as seen from the top of Fig. 4 but detached from the eyeglass.

The dust shields 18, 19, 20, 21, 22, of the various embodiments are open ended generally of frusto-conical shape and disposed so as to taper towards the eyeglasses with which they are associated. The shields may extend about the whole circumference of the rim of the eyeglass as shield 20 of Figs. 4 and 5, and shield 21 of Fig. 6, and thus form a truncated open ended cone, or they may extend only over a part of the circumference as the shields 18, 19 of Figs. 1 to 3 and shield 22 of Figs. 7 and 8 and thus form only a sector of a truncated open ended cone. In any case, when the eyeglasses are in position on the human head, indicated in horizontal profile by the broken line 25 of Fig. 1, the dust deflecting shields extend laterally and circumferentially along, or at least substantially along, the lateral entrance into the open space between eyeglass and outer corner of the eye.

Since the shields (18, 19) are tapering towards the eye-glasses (14, 15), air currents and dust entering into the space between eye and eyeglass will be deflected towards the eyeglass, flowing along the surfaces of the frusto-conical shield and thus following the angle of the cone. Dust particles, if deposited and not swept out by the air current, will be deposited on the inside of the eyeglass but will not reach and thus hurt the eye.

Figure 6:
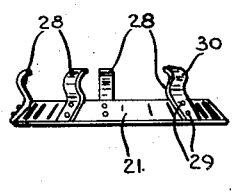
Fig. 6 is a similar view of another modification of the dust shield.

The shields may be of constant height along their circumference, as the embodiment of Fig. 6 illustrates or they may diminish in height from the outer corner side inwards as Figs. 2, 3 and 4, 5 illustrate.

The shields may be of any suitable material, such as of metal or of plastic composition conventional in optics, they may be opaque or translucent, or transparent and of any desired optical characteristics.

The dust deflecting shields may be permanently secured to the eyeglasses at their rims, or they may be made to be attachable thereto and detachable therefrom by the wearer of the glasses. The dust deflecting shields will be held in proper spaced relationship to the eyeglass and the eye, particularly the outer corner, by properly choosing the lengths of the supports which hold the shields at their eyeglasses or their rims. These supports may be of any number of legs 28 distributed over the circumference of the shields. At one end the legs 28 may be welded, riveted, screwed or otherwise secured to the shield, as indicated at 29, whereas the other end of the leg may be shaped so as to serve as a spring clip 30 to be hooked over the rim of the eyeglass. The legs or supports may also at this end be permanently secured to the rim of the eyeglass.

Figure 7:
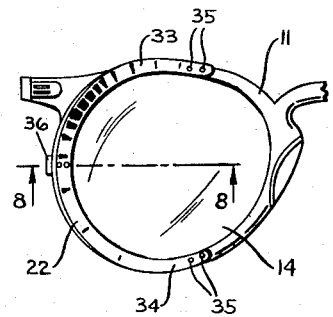
Fig. 7 is a rear view of an eyeglass with another modification of the dust shield, the temple having been detached.
Figure 8:
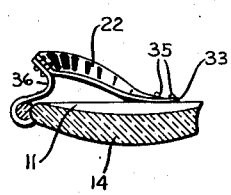
Fig. 8 is a fractional section along line 8—8 of Fig. 7.

In the embodiment illustrated in Figs. 7 and 8, the shield 22 is a strip of elastic material mounted at its ends 33, 34 flatly to the rim of the glass or the frame, by rivets 35 for instance, or by clamps or clips similar to clamps 28. The median part of strip 22 is bent into frusto-conical shape and held in proper position by the elasticity of its form. If desired, a clamp, such as illustrated at 36, may serve to secure the proper spacing of the dust deflecting shield from the eyeglass.

We claim:
1. Dust deflecting attachment for eyeglasses, spectacles, and the like, in the form of a frusto-conical open ended shield adapted to taper towards the eyeglass, supports carried by said shield for attaching the same to the eyeglass at the rim thereof, said supports being of a height so as to space said shield a distance apart from said rim and eyeglass, the height of said shield being short such that, when the eyeglass with the attachment is in position on the human head, said shield is also spaced a distance apart from the corner of the eye, said shield thus extending with clearance from both eyeglass and eye and laterally at least along the lateral entrance of the open space between eyeglass and outer corner of the eye; said shield sloping obliquely into the space between eyeglass and eye so as to leave open the entrance into said space, allow air currents to enter said space but deflect them away from the eye and towards the eyeglass without substantially impeding the lateral vision field of the eye.

2. Dust deflecting attachment for eyeglasses, as set forth in claim 1, wherein said frusto-conical shield diminishes in height from the outer corner side inwards.

3. Dust deflecting attachment for eyeglasses, as set forth in claim 1 wherein said frusto-conical shield is extended around the circumference of said eyeglass.

4. Dust deflecting attachment for eyeglasses, as set forth in claim 1 wherein said frusto-conical shield is extended from the outer corner side to the midst of the eyeglass.

5. Dust deflecting attachment for eyeglasses, as set forth in claim 1 wherein said frusto-conical shield is extended from the outer corner side to the midst of the eyeglass with diminishing height.

6. Dust deflecting attachment for eyeglasses, as set forth in claim 1 wherein said frusto-conical shield is a strip of elastic material adapted to be mounted at its ends flatly to the rim of the eyeglass in the vicinity of the upper and lower midsts thereof and further is bent into frusto-conical shape tapering towards said eyeglass and in spaced relationship thereto.

MAX GOLDSCHMIDT.
ALBERT SOMMER.

REFERENCES CITED

The following references are of record in the file of this patent:

UNITED STATES PATENTS

| Number | Name | Date |
|---|---|---|
| 1,064,468 | Fox | June 10, 1913 |
| 2,052,772 | Jones | Sept. 1, 1936 |

FOREIGN PATENTS

| Number | Country | Date |
|---|---|---|
| 1,122 | Switzerland | June 19, 1889 |
| 219,468 | Great Britain | July 31, 1924 |
| 296,945 | Great Britain | Sept. 13, 1928 |
| 539,692 | Great Britain | Sept. 19, 1941 |
| 794,475 | France | Dec. 12, 1935 |